UNITED STATES PATENT OFFICE.

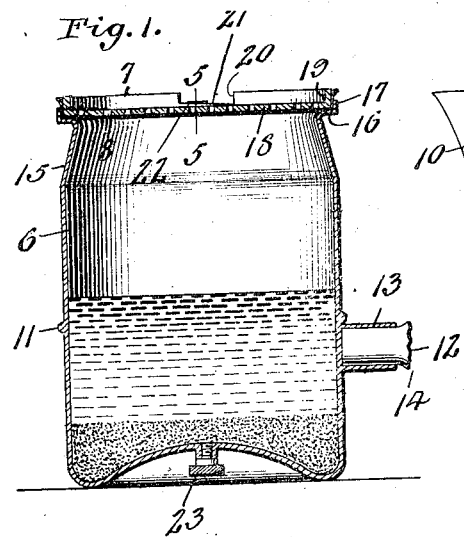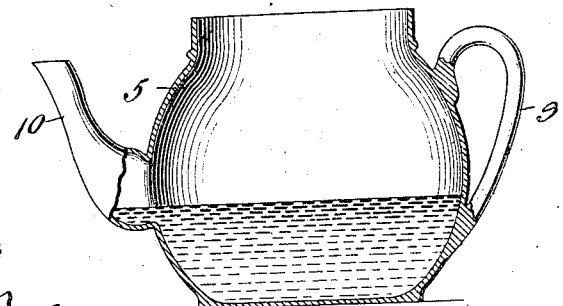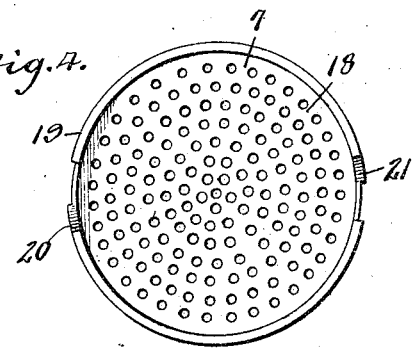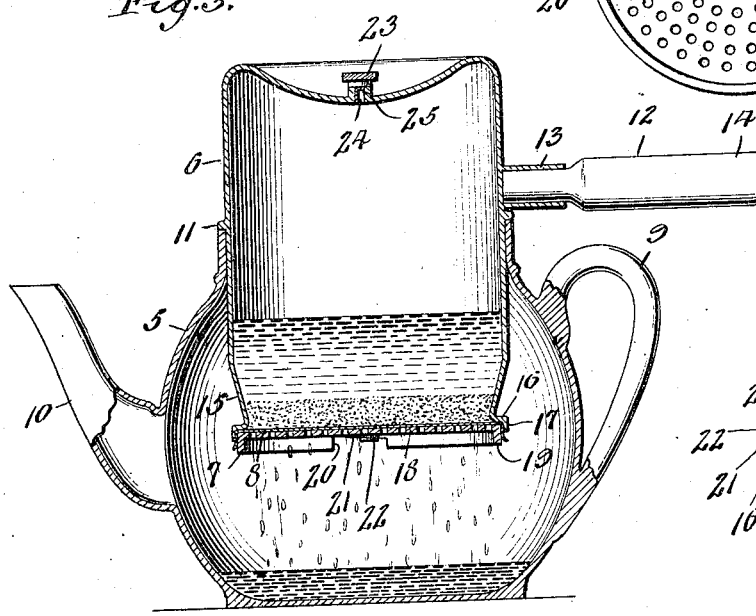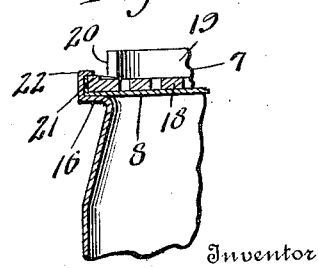

EDWARD M. SWING, OF WASHINGTON, DISTRICT OF COLUMBIA.

DRIP-COFFEE POT.

1,160,011.  Specification of Letters Patent.  Patented Nov. 9, 1915.

Application filed March 4, 1914. Serial No. 822,261.

*To all whom it may concern:*

Be it known that I, EDWARD M. SWING, a citizen of the United States of America, residing at Washington, District of Columbia, have invented certain new and useful Improvements in Drip-Coffee Pots, of which the following is a specification.

This invention relates to improvements in coffee pots and has particular reference to that class known as drip coffee pots.

The present day method and use of pots employing a bag or rag as a filtering medium is decidedly objectionable, in that there is always present a slight rag flavor that ruins the fine quality of the finest of beverages.

The invention has for its primary object the elimination of all the bad and faulty coffee making methods by the provision of a combination, construction and arrangement of parts which produce in their entirety a coffee pot which turns out coffee clear as wine, golden, and the right flavor, in the least possible time and with the use of a minimum quantity of coffee.

The invention further contemplates the provision of a coffee pot of the character mentioned, wherein the different receptacles have no square edges, and perfectly smooth inner surfaces, thus eliminating all crevices and projections for the lodgment of coffee grounds, dirt or other foreign matter, thereby rendering the pot easy to clean as well as sanitary.

Another object of the invention is the provision of a coffee pot of the class in question, which comprises comparatively few parts, simple in construction, cheap to manufacture, and one highly efficient for its purpose.

Other objects of the invention will appear from the following description considered in connection with the accompanying drawing, in which like numerals of reference indicate similar parts in the several views, and in which;

Figure 1 is a vertical sectional view through the invertible receptacle. Fig. 2 is a similar view through the outer vessel. Fig. 3 is a sectional view through the pot with the parts assembled. Fig. 4 is a plan view of the perforated cover. Fig. 5 is a detail section taken on line 5—5 of Fig. 1.

The invention essentially consists of the vessel 5, an invertible receptacle indicated at 6, the perforated cap 7, and the filtering medium 8.

The vessel 5 is constructed in accordance with the ordinary and well known form of coffee or tea pot, and made from earthenware or any suitable material to permit of its use as a kettle for boiling the water for the coffee. The vessel is provided with a suitable handle as at 9, the spout 10 and may be made of any desired capacity.

The receptacle 6 is constructed as shown and preferably made from a single piece of any suitable material. The body portion of the receptacle is of slightly lesser diameter than the mouth of the vessel 5 and is adapted to snugly fit within the latter as shown in Fig. 3. The receptacle is provided with a circumferential bead 11 which rests against the upper edge of the vessel 5 to support the former in inverted position within the latter. A suitable handle 12 projects outwardly from the body portion of the receptacle 6 below the bead 11 to facilitate the operative association of the receptacle with the vessel, and their separation during the act of making coffee. As shown in this particular instance, the handle comprises a short socket member 13 in which is snugly fitted the removable handle 14 which is adapted to be removed for shipping purposes.

The receptacle may be of any desired capacity and has its body portion from a point adjacent its upper edge inclined inwardly to provide a reduced neck portion 15, which terminates in an outwardly extended circumferential flange 16 forming a seat for the perforated cover 7 to be hereinafter more fully described. The flange 16 is formed to provide a vertical flange 17 which embraces the walls of the cover 7. By reason of this particular construction, together with the fact that the bottom of the receptacle is concave having rounded edges, the receptacle is provided with a perfectly smooth interior, free from all crevices and projections in which the coffee grounds, dirt and other foreign matter would collect, thus rendering the pot extremely easy to clean as well as sanitary.

The cover 7 comprises a perforated bottom 18 from which rises the vertical wall 19 which is cut away at diametrically opposite points as at 20 to provide the cam or beveled surfaces 21 which when brought into engagement with the lugs 22, projecting inwardly from the flange 17, hold the cover immovably positioned upon the receptacle. As will be understood the cut away portion 20 permits the cover to be seated upon the flange 16 and by slightly turning the cover to the right the same will be locked in position, and vice versa.

In use, before the perforated cover 7 is locked in position, the filtering element 8 which comprises a single sheet of rice paper is laid across the top of the receptacle. Obviously when the cover is locked in position on the receptacle the filtering element is effectively clamped therebetween, and the flanges 16 and 17 of the receptacle. The reason I specifically state that the filtering element is in the nature of rice paper, is because experience has taught that this is the only filtering medium which relieves the beverage of that disagreeable rag taste noticeable in coffee which percolates through a bag or cloth.

It is a well known fact that the only correct method of making good coffee is to have everything connected therewith sufficiently heated, and by reason of this fact I boil the water for the coffee in the vessel 5 thus heating the latter to a sufficiently high degree. The pulverized coffee is then placed in the receptacle 6, followed immediately by the boiling water. The rice paper is next laid across the top of the receptacle and finally the perforated cover is locked in position, thus clamping the paper or filtering medium in the manner hereinabove described. After being allowed to stand a short while, the receptacle 6 is inverted and supported in the vessel 5, in the manner shown in Fig. 3. The coffee then percolates into the vessel 5, after which it is ready to be served. To speed this latter operation I employ an air valve 23 of any suitable construction. In one embodiment of the invention I have shown the valve as consisting of a hollow stem 24 threadedly adjustable through a central aperture in the bottom of the receptacle. The stem is slotted at one side as at 25 so that when the latter is partly moved from the aperture air is admitted into the receptacle as will be readily understood.

A wine glass of coffee made in my pot and held up in front of the light reveals a liquor absolutely free from any sediment, cloudiness or grounds and with the full strength and flavor of the coffee in it.

Directions for coffee pots of the present day use call for one-half ounce of coffee to every cup of the breakfast size desired, and another half-ounce for the pot. I contend that on every making of coffee I save half an ounce of coffee, as this latter half an ounce is absolutely not necessary.

While I have shown and described what I now consider the best embodiment of my invention I desire to have it understood that the same is merely illustrative, and that various changes in the construction, proportion and the like may be resorted to when desired as fall within the scope of the appended claim.

Having thus described the invention, what I claim is:

An invertible percolating receptacle for coffee pots comprising a body of uniform diameter throughout the major portion of its length and having a reduced neck portion terminating in an outwardly extending circumferential flange, a vertical flange rising from the lateral flange in a plane with the body portion of the receptacle, a flexible filtering element adapted to be laid across the open end of the receptacle, a cup-shaped cover for clamping said element in position therebetween and said flanges, and a valve in the opposite end of the receptacle.

In testimony whereof I have hereunto set my hand in presence of two subscribing witnesses.

EDWARD M. SWING.

Witnesses:
EDWARD YEAGER,
BENNETT S. JONES.